United States Patent [19]

Suenaga

[11] 3,950,779
[45] Apr. 13, 1976

[54] HUE CONTROL CIRCUIT FOR COLOR TELEVISION RECEIVERS

[75] Inventor: Kazuyuki Suenaga, Yokohama, Japan

[73] Assignee: Victor Company of Japan, Limited, Japan

[22] Filed: Apr. 22, 1974

[21] Appl. No.: 463,093

[30] Foreign Application Priority Data
Apr. 25, 1973 Japan.............................. 48-46995

[52] U.S. Cl. ................................................. 358/28
[51] Int. Cl.² ........................................ H04N 9/535
[58] Field of Search ............. 358/27, 28, 29, 39, 40

[56] References Cited
UNITED STATES PATENTS
3,109,887   11/1963   Bradley................................. 358/27
3,864,723   2/1975   Carpenter........................ 358/27 X Primary Examiner—Robert L. Richardson
Attorney, Agent, or Firm—Robert E. Burns; Emmanuel J. Lobato; Bruce L. Adams

[57] ABSTRACT

The hue of a color image is controlled by a detector which monitors the luminance signal level to produce a gain control signal when it exceeds a predetermined level to effect reduction in the relative proportion of the red content in a whitish area in the color image without sacrifice to adversely affect the faithful reproduction of flesh tones. The detector may be arranged to monitor the output level of red primary color so as to effect control in the amount of the red color output so that redish cast in the color image is effectively suppressed without sacrifice in the reproduction of flesh tones.

16 Claims, 9 Drawing Figures

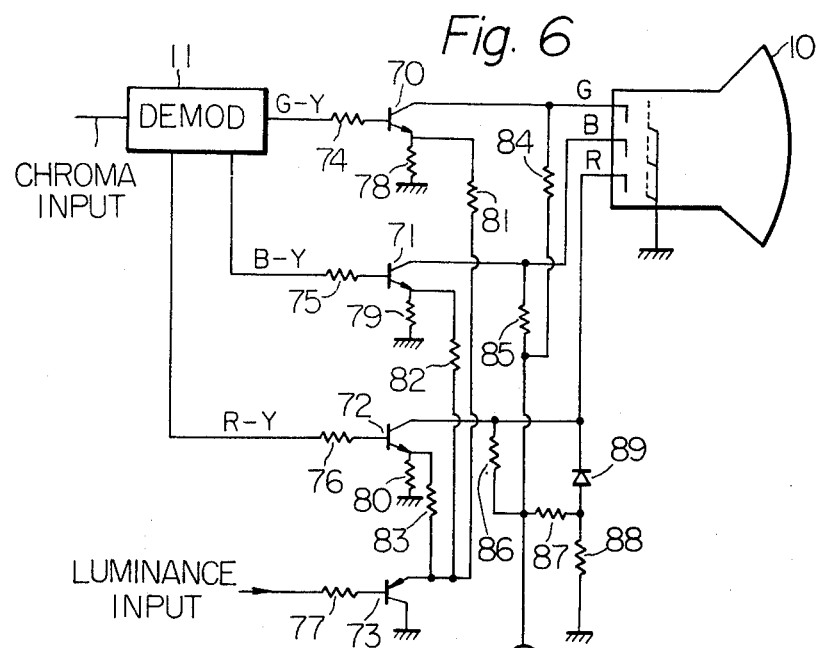
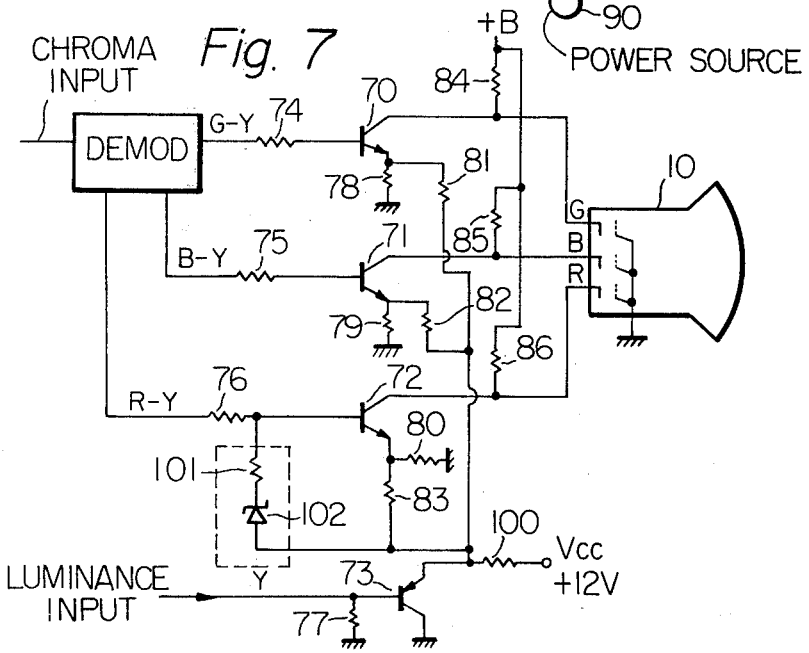

HUE CONTROL CIRCUIT FOR COLOR TELEVISION RECEIVERS

The present invention relates to color television receivers and, more particularly, to a circuit arrangement for suppressing the red content in a reproduced color image.

In the standard color television system, a white signal is a blend of red, green and blue primary colors, and a reference white has a rated color temperature value of 9300°K + 8 MPCD (minimum perceptible color difference). However, the actual color image reproduced from the standard composite color television signal would have a redish white as compared with the black-and-white television. Therefore, it is desirable to suppress the redish cast in the whitish area or the entire area of a reproduced color image. However, mere shifting of the reference white to a higher color temperature region in the chromaticity diagram so as to reduce the relative proportion of the red content would adversely affect the faithful reproduction of flesh tones.

It is therefore the principal object of the present invention to suppress the redish cast in the whitish area in a reproduced color image without sacrifice to degrade the color quality of flesh tones.

Another object of the invention is to suppress the redish cast in the entire area of the reproduced color image without sacrifice to degrade the color quality of flesh tones.

In accordance with the present invention, there is provided a hue control circuit in combination with a color television receiver having a cathode-ray tube for reproducing a color image including a reference white in response to a received composite signal including luminance information, wherein the hue control circuit comprises a detector for sensing the brightness level of the luminance information when the brightness level exceeds a predetermined level relative to the maximum brightness level of the reference white, an amplifier coupled to a control electrode of the cathode-ray tube, and circuit means coupled to the detector and to the amplifier for cooperating with the detector and correspondingly varying the operating characteristic of the amplifier such that the emission of electron beam associated with the control electrode is varied, whereby the red content in a whitish area in the color image is correspondingly decreased upon the detector sensing the brightness level exceeding the predetermined level.

The present invention is further provided with a hue control circuit in combination with a color television receiver having a cathode-ray tube for reproducing a color image including a reference white in response to a received composite signal, wherein the hue control circuit comprises a detector for sensing the brightness level of a primary color when the brightness level exceeds a predetermined level relative to the maximum brightness level of the reference white, an amplifier coupled to a control electrode of the cathode-ray tube, and circuit means coupled to the detector and to the amplifier for cooperating with the detector and correspondingly varying the operating characteristic of the amplifier such that the emission of electron beam associated with the control electrode is varied, whereby the redish cast in the color image is correspondingly suppressed upon the detector sensing the brightness level exceeding the predetermined level.

The invention is characterized in that when the brightness level of the luminance information or of the primary color exceeds the fifty percent level of the maximum brightness level of the reference white, the detector supplies a gain control signal to the amplifier so that the amplifier is varied to reduce the electron emission of the beam associated with the amplifier so that the relative proportion of the red content in the whitish area or the entire area of a reproduced color image is decreased.

The present invention will be further described by way of example with the accompanying drawings, in which:

FIG. 6 is a detailed circuit arrangement of the block diagram of FIG. 4;

FIG. 7 is a modified form of the FIG. 6 circuit arrangement;

Figure 1:
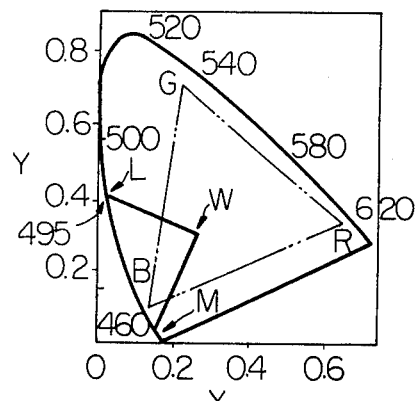
FIG. 1 is the chromaticity diagram established by the Commission Internationale de l'Eclairage useful for describing the principle of the invention.

Referring now to the drawings, particularly to FIG. 1, wherein the CIE (Commission Internationale de l'Eclairage) chromaticity diagram is shown for better understanding of the invention. In the diagram, a reference white in a reproduced color television image corresponds to a point indicated at W, and the primary colors red, green and blue are indicated at R, G, and B located at the vertexes of a triangle which defines the range of colors transmitted and reproduced in the standard color television system. However, the color image reproduced from the standard composite color television signal having a preselected relative proportions of the color components to produce the reference white would have a redish cast over the whitish area. A recent survey revealed that the reference white when shifted from the point W to a point in a region defined by lines WL, WM, GB and BR, where points L and M correspond to wavelengths of 460 and 496 nm, respectively in the chromaticity diagram, the redish cast in the reproduced whitish area disappears to the satisfaction of viewer's personal tastes. The survey also revealed that if the reference white is shifted from the point W to any point in the described region when the luminance signal exceeds a predetermined value, faithful reproduction of flesh tones is not adversely affected.

Figure 2:
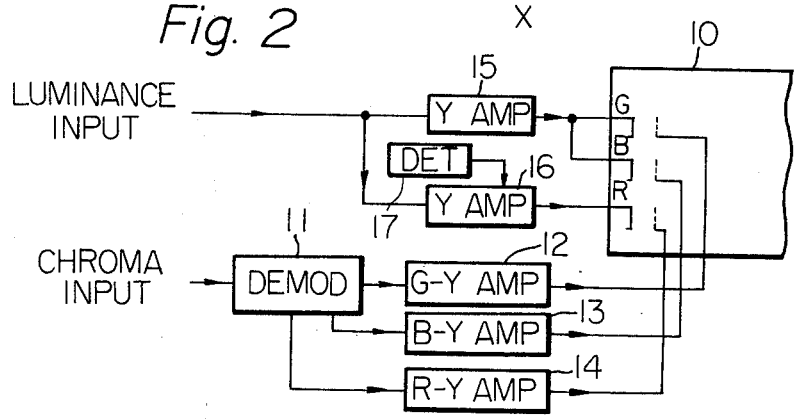
FIGS. 2 to 4 show various schematic block diagrams for feeding primary color signals to control electrodes of a tri-color cathode-ray tube to which the present invention is applicable.
Figure 9:
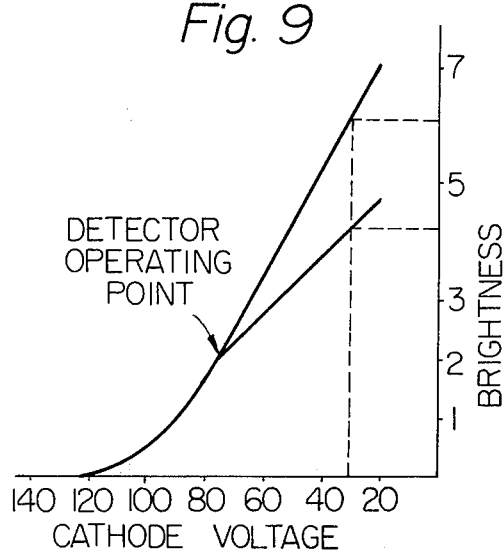
FIG. 9 is a graphic representation of the operating characteristic curve of a red amplifier showing cathode voltage versus output brightness.

FIG. 2 illustrates a circuit block diagram, to which the present invention is applicable, for feeding primary color signals to a tri-color cathode-ray tube 10 of the conventional construction. In FIG. 2, a chrominance signal is applied to a demodulator 11 which provides green-minus-luminance (G—Y) color-difference signal, blue-minus-luminance (B—Y) color-difference signal and red-minus-luminance (R—Y) color-difference signal to respective amplifiers 12, 13 and 14. The amplified color-difference signals are applied to the control grids of the cathode-ray tube 10. A luminance signal (Y signal) is applied to Y amplifiers 15 and 16, the former providing an amplified luminance signal to the green and blue picture tube cathodes and the latter providing an amplified luminance signal to the red picture tube cathode. In accordance with the invention, a detector 17 is coupled to the Y amplifier 16 to detect the amplitude of the luminance signal when it exceeds a predetermined amplitude, preferably, the 50 percent level of the maximum level of the signal corresponding to the reference white. Upon detection of the luminance signal exceeding the predetermined signal level, the detector 17 provides a gain control signal to the Y amplifier 16 so that the output level thereof is lowered as shown in FIG. 9. It is clear that before the luminance signal reaches the predetermined level the luminance amplifier 16 provides a higher gain for the signal input thereto than for the signal after the luminance signal has reached the predetermined signal level. With the red content being suppressed, the reference white in the chromaticity diagram is correspondingly shifted from the point W to a point lying within the region defined by lines WM, WL, GB and BR.

Figure 3:
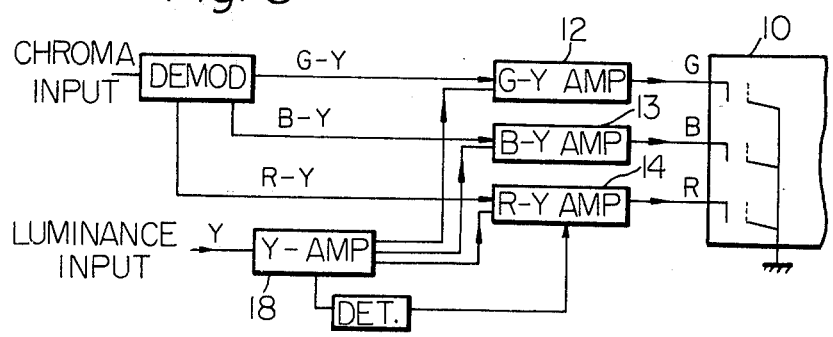

Since various circuit arrangements are known in the art for combining color-difference signals with the luminance signal in reproducing the primary color signals and feeding them to control electrodes (cathodes or control grids of the picture tube), the present invention is not restricted to that shown in FIG. 2. FIG. 3 is, for example, substantially similar in concept to FIG. 2, but differs in that a single luminance amplifier 18 is employed for combining the luminance signal with color-difference signals, the resultant color primary signals being delivered to the respective cathodes of the picture tube 10. The detector 17 has the similar function as that described above and provides a gain control signal to the R—Y amplifier so that the output level of the red primary signal is correspondingly lowered as shown in FIG. 9.

The reference white is a blend of red, green and blue primary colors at their maximum brightness. The luminance signal therefore reaches a maximum value when the reference white is being transmitted. The predetermined signal level as referred to above at which the detector 17 is energized corresponds to a luminance level 50% as bright as the maximum brightness of the luminance signal. In accordance with the standard color television system, the red primary is 30% as bright as the reference white. The luminance level exceeding the predetermined signal level occurs when a whitish image is being reproduced as well as when the reference white is being reproduced.

Figure 4:
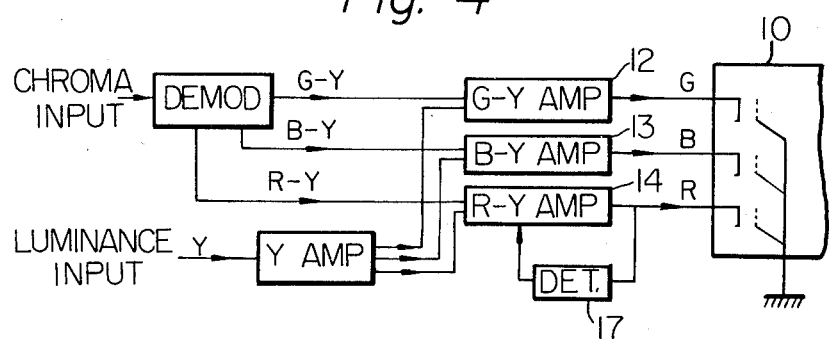

In FIG. 4, another circuit arrangement is shown and comprises a generally similar arrangement to FIG. 3, but differs in that the detector 17 is coupled to the output of the R—Y amplifier 14 which has the same function as that previously described to provide a gain control signal to the R—Y amplifier 14. The resultant signal level at the output thereof is lowered in the same manner as the previous embodiments. Since the detector 17 monitors the combined outputs of the luminance and R—Y color-difference signals, the detector is energized to produce a control signal not only when the luminance input exceeds the predetermined level while a whitish image is being reproduced, but also when the combined output level exceeds that level while a redish image is being reproduced. This embodiment is particularly applicable to a color television receiver of the type wherein a reproduced color image is increasingly become redish as the luminance level is adjustably increased. The present embodiment effectively suppresses the redish cast in a reproduced color image to the satisfaction of viewers.

Figure 5:
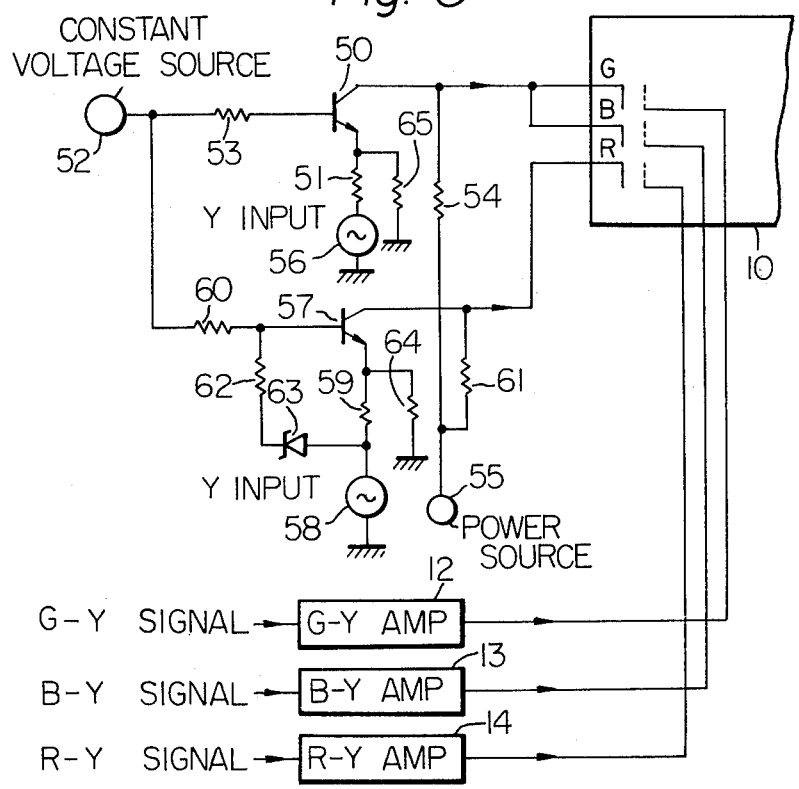
FIG. 5 is a detailed circuit arrangement of the block diagram of FIG. 2.

A detailed circuit arrangement of FIG. 2 is shown in FIG. 5. A transistor 50 receives the luminance input on the emitter thereof through a resistor 51, the base electrode being biased at a potential determined by a constant voltage source 52 through resistor 53. A load impedance 54 is coupled to the collector of transistor 50 and to a positive power source 55. The transistor 50 and its associated circuit elements thus constitute the luminance amplifier 15 of FIG. 2 and supplies an amplified luminance output to the green and blue cathodes of the cathode-ray tube 10 to produce green and blue primary colors in cooperation with the G—Y and B—Y color-difference outputs supplied to the green and blue cathodes of the picture tube 10 from the amplifiers 12 and 13 respectively. A transistor 57 has its emitter similarly coupled to the luminance signal source 58 through resistor 59, with the base held at a bias potential supplied from the constant voltage source 52 through resistor 60. A load impedance 61 is also coupled to the collector and to the power source 55. The transistor 57 and its associated circuit elements thus constitute the luminance amplifier 16 of FIG. 2 and supplies an amplified luminance output to the red cathode of the picture tube 10 to produce red primary color in cooperation with the R—Y color-difference output supplied to the associated control grid of the tube from the amplifier 14. A series-connected resistor 62 and a zener diode 63 is coupled across the base of transistor 57 and the resistor 59 as illustrated, the zener diode having its cathode terminal coupled to resistor 62 and its anode coupled to resistor 59. Under normal condition the zener diode 63 remains nonconductive. When the luminance signal level exceeds a predetermined level which corresponds to the 50 percent level of the maximum brightness level of the reference white, the voltage across the zener diode exceeds its breakdown voltage to cause the zener diode to start conducting. A feedback loop is thus formed across the base and emitter electrodes of transistor 57. Since resistor 64 serves as an emitter bias resistor and has a negligibly high impedance as compared with the value of resistance 59, the amplifier gain of the transistor 57 can be expressed as follows:

$$G = \frac{\beta \cdot R_{61}}{(1+\beta) R_{59}(1 + R_{60}/R_{62}) + R_{60}} \quad (1)$$

where, $R_{61}$, $R_{59}$, $R_{60}$ and $R_{62}$ are the resistance values of resistors 61, 59, 60 and 62, respectively, and $\beta$ is the current amplification factor of transistor 57. Under the normal nonconductive state, resistor 62 becomes infinite, and the amplifier gain becomes $$G = \frac{\beta \cdot R_{61}}{(1+\beta) R_{59} + R_{60}} \quad (2)$$

It is seen from Equations 1 and 2 that when the zener diode 63 is rendered conductive the amplifier gain of transistor 57 is decreased when the luminance signal level exceeds the predetermined level with the result that the electron emission of the red cathode of the tube 10 is correspondingly lowered as shown in FIG. 9. The zener diode 63 may be replaced with a set of series-connected diodes inserted into the feedback loop in the forward-biased relation to the base and emitter potentials of transistor 57 if the resultant voltage at which a forward current starts flowing has the same voltage as the breakdown voltage of the zener diode.

FIG. 6 shows a detailed circuit arrangement of FIG. 4. The base of a transistor 70 is coupled through a resistor 74 to the demodulator 11. The emitter of the transistor is coupled through resistor 81 to the emitter of transistor 73 which amplifies luminance signal applied to the base thereof through resistor 77. A resistor 78 is coupled to the emitter of transistor 70 and to ground to provide a bias potential to the emitter. The collector is coupled to the green cathode of the picture tube 10 and to a power source 90 through load impedance 84. Combined output of G—Y color-difference signal and luminance signal appears on the green cathode to produce a green primary color. Transistor 71 with its associated circuit elements has the same function to produce a combined output of B—Y color-difference signal and luminance signal on the blue cathode of the tube 10. Similarly, transistor 72 and its associated circuit elements produce a red primary color by combining R—Y color-difference signal and luminance signal. In accordance with the invention, a resistor 87 and a diode 89 are connected in series and further coupled to in parallel relation to the load impedance 86 of transistor 72. A resistor 88 is coupled to the junction between the diode 89 and the resistor 87 and to ground forming a current path for the power source to establish a constant voltage which serves as a reference voltage level. The potential at the collector of transistor 72 decreases inversely with an increase in the input signal level. When the input signal has a low signal amplitude, the collector is at a potential higher than the reference voltage and the diode remains nonconductive. With an increase in the input signal level, the collector potential falls below the reference level and the diode 89 starts conducting. Upon the diode 89 becoming conducting, the resistor 87 is brought into circuit in parallel with the load impedance 86 so that the operating characteristic of transistor 72 is varied as illustrated in FIG. 9 as previously noted to produce a decreased red output on the red cathode. Since the diode 89 monitors the combined output level of the R—Y color-difference and luminance signals, the relative proportion of the red content is reduced not only when a whitish image is being reproduced, but also when a redish image is being reproduced. The reference level is so chosen that the diode 89 starts conducting when the red brightness level reaches the 50 percent level of the maximum brightness of white. Therefore, a redish cast in the reproduced color image is suppressed when the red brightness exceeds the 50 percent level of the maximum brightness of white.

A modified form of FIG. 6 is shown in FIG. 7 which is substantially similar to FIG. 6, but differs in that a resistor 101 and a zener diode 102 in a dashed-line block are coupled to the base of transistor 72 and to the emitter thereof through resistor 83. The voltage across the series-connected resistor and zener diode varies in proportion to the combined signal level of the R—Y color-difference signal supplied to the transistor 72 and the luminance signal supplied to the transistor 73. The zener diode 102 starts conducting when the voltage thereacross exceeds the breakdown voltage and forms in combination with the resistor 101 a feedback loop between the base and emitter of transistor 72. The feedback loop has the same circuit function as previously described with reference to FIG. 5 and serves to reduce the red primary signal applied to the red cathode of tube 10.

Figure 8:
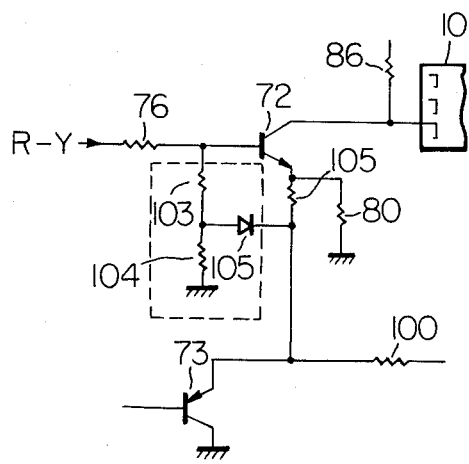
FIG. 8 is a modified form of the FIG. 7 circuit arrangement.

The zener diode 102 may be replaced with a circuit arrangement in a dashed-line block of FIG. 8 which comprises series-connected resistors 103 and 104 coupled to the base of transistor 72 and to ground forming a voltage divider, and a diode 105 coupled to the junction of the resistors 103 and 104 and to the emitter of transistor 72 by way of resistor 83. The conduction starting voltage of diode 105 may be chosen by suitably selecting the resistance values of resistors 103 and 104. Since the resistors 103 and 104 divides the base potential of transistor 72, the suitable selection of the resistance values prevents reduction of the red primary output when a redish image is being reproduced so that redish cast in the reproduced image is not unduly suppressed while redish content in the reproduced white is effectively suppressed.

Although the foregoing description has been concerned with the reduction of relative proportion of red content in a reproduced image to effect shifting of the reference white in the chromaticity diagram to a point in the region as referred to above, it is also possible to effect the shifting of reference white by increasing the relative proportion of the green or blue primary component so that relative proportion of the red content is reduced.

What is claimed is:

1. In a color television receiver adapted to receive a composite color television signal including chrominance and luminance signals and including a tri-color cathode ray tube having first, second and third control electrodes adapted to receive the red, green and blue signals, respectively, derived from said chrominance signal, a hue control circuit comprising, means for detecting the level of said luminance signal to produce a control signal when said signal is above a predetermined level, and gain controlled amplifier means coupled to said third control electrode and arranged to reduce its gain of amplification in response to said control signal so that the red content in a reproduced image is suppressed.

2. A hue control circuit as claimed in claim 1, wherein said gain controlled amplifier means is an amplifier adapted to amplify said red signal.

3. A hue control circuit as claimed in claim 1, wherein said gain controlled amplifier means is an amplifier adapted to amplify said luminance signal.

4. A hue control circuit as claimed in claim 1, wherein said predetermined level is at a fifty percent value of the maximum level of said luminance signal.

5. A hue control circuit as claimed in claim 1, wherein said amplifier means is a transistor, and wherein said detecting means includes a breakdown diode coupled to said transistor in a gain control relation.

6. A hue control circuit as claimed in claim 5, wherein said detecting means further includes a resistor coupled in series with said diode between the emitter and base of said transistor.

7. A hue control circuit as claimed in claim 1, comprising a constant voltage source, a first transistor having its base coupled to said source, its emitter being receptive of said luminance signal and its collector coupled to said first and second control electrodes, a second transistor having its base coupled to said source, its emitter being receptive of said luminance signal, and its collector coupled to said third control electrode, and a breakdown diode coupled between the base and emitter of said second transistor to reduce the gain of amplification of said second transistor when the potential across said diode exceed a predetermined level.

8. In a color television receiver adapted to receive a composite color television signal including chrominance and luminance signals and including a tri-color cathode ray tube having first, second and third control electrodes adapted to receive the red, green and blue signals, respectively, derived from said chrominance signal, a hue control circuit comprising, means for detecting the level of said red signal to produce a control signal when said red signal is above a predetermined level, and gain controlled amplifier means coupled to said first control electrode and arranged to reduce its gain of amplification in response to said control signal so that the red content in a reproduce image is suppressed.

9. A hue control circuit as claimed in claim 8, wherein said gain controlled amplifier is a transistor, and wherein said detecting means includes a breakdown diode coupled to said transistor in gain control relation.

10. A hue control circuit as claimed in claim 9, wherein said detecting means further includes a resistor coupled in series with said diode between the emitter and base of said transistor.

11. A hue control circuit as claimed in claim 9, wherein said detecting means further includes a resistor coupled in parallel with said diode in an output circuit of said amplifier means.

12. A hue control circuit as claimed in claim 8, comprising a first transistor in emitter follower configuration having its base receptive of said green signal and its collector coupled to said first control electrode;

a second transistor in emitter follower configuration having its base being receptive of said blue signal and its collector coupled to said second control electrode;

a third transistor in emitter follower configuration having its base being receptive of said red signal and its collector coupled to said third control electrode;

a fourth transistor in emitter grounded configuration having its base being receptive of said luminance signal and its collector coupled to the emitter of said first, second and third transistors;

a first resistor coupled between the collector of said third transistor and a power source; and a circuit including a second resistor and a breakdown diode in series circuit relation, said circuit coupled in parallel with said first resistor to reduce the resultant resistance when the potential across said diode exceeds a predetermined level to thereby reduce the gain of amplification of said third amplifier.

13. A hue control circuit as claimed in claim 12, wherein the collector of said fourth transistor is coupled to the emitter of said first, second and third transistor through a resistor.

14. A hue control circuit as claimed in claim 8, comprising a first transistor in emitter follower configuration having its base being receptive of said green signal and its collector coupled to said first control electrode;

a second transistor in emitter follower configuration having its base being receptive of said blue signal and its collector coupled to said second control electrode;

a third transistor in emitter follower configuration having its base being receptive of said red signal and its collector coupled to said third control electrode;

a fourth transistor in emitter grounded configuration having its base being receptive of said luminance signal and its collector coupled to the emitter of said first, second and third transistors; and a breakdown diode coupled between the base and emitter of said third transistor to reduce the gain of amplification of said third transistor when the potential across said diode exceeds a predetermined level.

15. A hue control circuit as claimed in claim 14, wherein the collector of said fourth transistor is coupled to the emitter of said first, second and third transistors through a resistor.

16. A hue control circuit as claimed in claim 14, comprising first and second resistors in series circuit relation coupled between the base of said third transistor and ground, said breakdown diode being coupled between the interconnection of said first and second resistors and the emitter of said third transistor.

* * * * *